(12) United States Patent
Bertocchi et al.

(10) Patent No.: US 7,859,163 B2
(45) Date of Patent: Dec. 28, 2010

(54) LAMINAR ARTICLE FOR ELECTRICAL USE AND A METHOD AND MACHINE FOR PRODUCING SAID ARTICLE

(75) Inventors: Gianluca Bertocchi, Rho (IT); Gianfranco Gardanini, Lainate (IT); Daniele Bonetti, Saronno (IT); Maurizio Perucchi, Valera Fratta (IT)

(73) Assignee: Corrada S.p.A., Milan (IT)

( * ) Notice: Subject to any disclaimer, the term of this patent is extended or adjusted under 35 U.S.C. 154(b) by 471 days.

(21) Appl. No.: 11/810,042

(22) Filed: Jun. 4, 2007

(65) Prior Publication Data

US 2008/0282530 A1 Nov. 20, 2008

(30) Foreign Application Priority Data

Mar. 14, 2007 (IT) .......................... MI2007A0508

(51) Int. Cl.
*H02K 1/00* (2006.01)
(52) U.S. Cl. .............................. 310/216.048
(58) Field of Classification Search ................
310/216.015–216.019, 216.048
See application file for complete search history.

(56) References Cited

U.S. PATENT DOCUMENTS 4,979,285 A * 12/1990 Martin ......................... 29/598
5,142,178 A * 8/1992 Kloster et al. ......... 310/216.048
5,338,996 A * 8/1994 Yamamoto ............ 310/216.048
5,923,112 A * 7/1999 Bertocchi et al. ..... 310/216.048
2002/0047463 A1* 4/2002 Neuenschwander ......... 310/216
2003/0127937 A1* 7/2003 Kanno et al. ................. 310/216

FOREIGN PATENT DOCUMENTS

FR 2382840 6/1978
IT M196A002566 10/1997

* cited by examiner

*Primary Examiner*—Nguyen N Hanh
(74) *Attorney, Agent, or Firm*—Ladas & Parry, LLP

(57) ABSTRACT

The laminar article for electrical use comprises a plurality of superposed first metal laminations fixed together. Each of the first laminations is provided with at least one fastener projecting from a first surface thereof and defining a recess in its opposite side. Each fastener of one lamination is arranged to fit into a recess of an adjacent lamination. The article presents second laminations interposed between at least two adjacent first laminations fixed together. The second laminations are provided with through apertures which are traversed by the fasteners which fix the adjacent first laminations together. The method consists of die-cutting a plurality of laminations from a metal sheet, rotating the die-cut laminations and superposing them, to then fix them together in predetermined manner. The laminations can be die-cut with a reference axis thereof rotated through a predetermined angle about a reference axis of the sheet metal, to limit the rotations to be imposed on the laminations during their mutual fixing.

14 Claims, 3 Drawing Sheets

Fig. 1
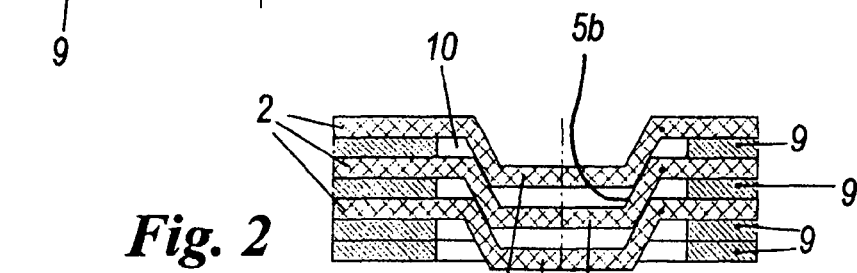
Fig. 2
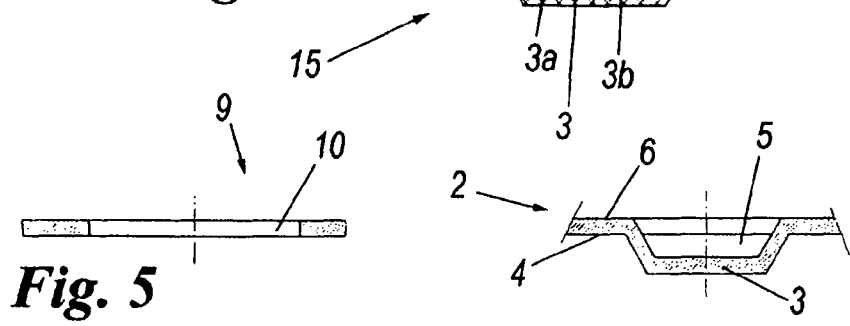
Fig. 5
Fig. 3
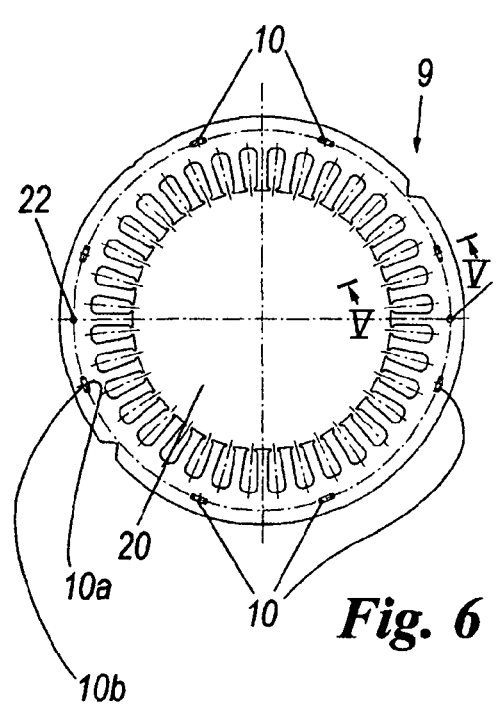
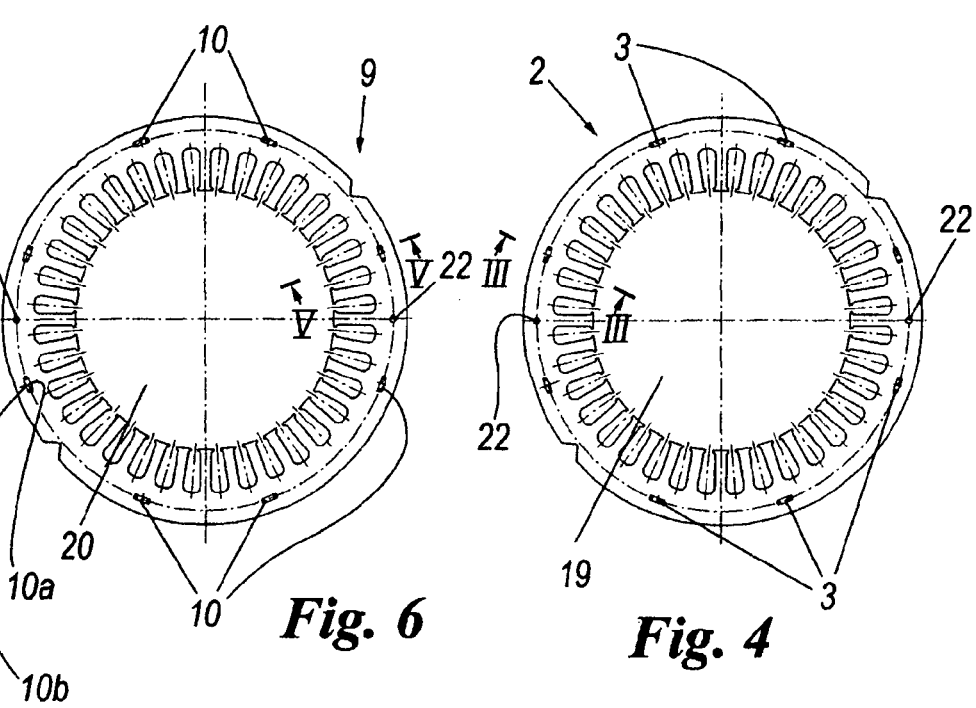
Fig. 6
Fig. 4

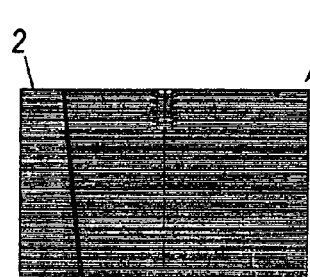
*Fig. 7*
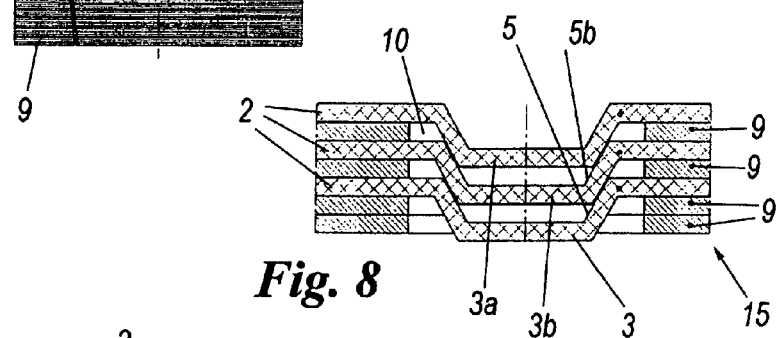
*Fig. 8*
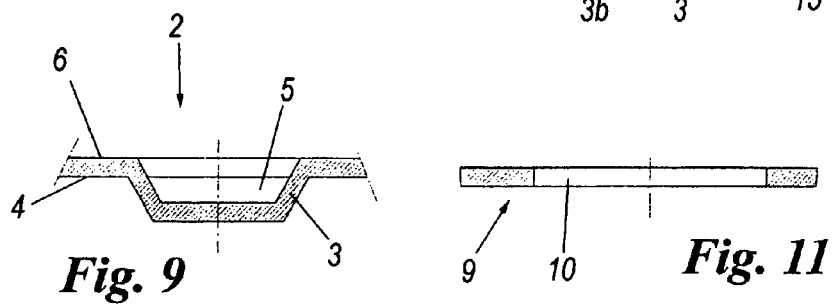
*Fig. 9*   *Fig. 11*
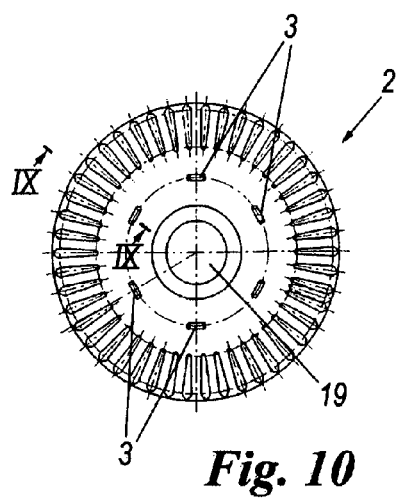
*Fig. 10*
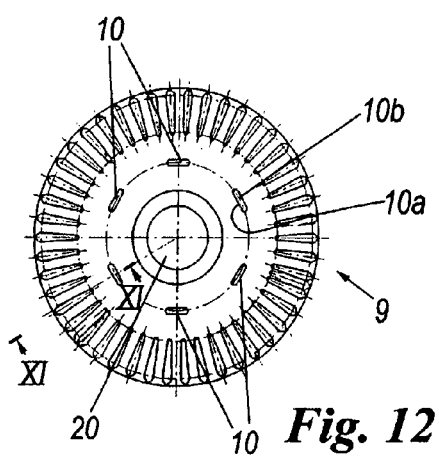
*Fig. 12*

LAMINAR ARTICLE FOR ELECTRICAL USE AND A METHOD AND MACHINE FOR PRODUCING SAID ARTICLE

FIELD OF THE INVENTION

The present invention relates to a laminar article for electrical use, and to a method and machine for producing said laminar article.

BACKGROUND OF THE INVENTION

Electrical machines such as motors or transformers are usually formed from magnetic circuits of lamellar structure, i.e. formed from a plurality of mutually superposed laminations fixed together.

DISCUSSION OF THE RELATED ART

Specifically, such laminations are provided with fasteners formed by plastic deformation and projecting from a surface thereof to define a protuberance on one side and a seat on the opposite side; the laminations are traditionally fixed together by inserting the fasteners of one lamination into the seats of a directly adjacent lamination.

However this structure presents numerous drawbacks, including in particular incorrectly coupling adjacent laminations together; in practice, because of the manner in which the fastener/seat pairs are formed, a small air space remains between the laminations of the lamellar structure, to impede correct lamination stacking, with consequent problems in the electrical behaviour of the lamellar structure, and in the definition of the overall dimensions of the structure itself, with the generation of a characteristic "springy" effect within the lamellar structure, and sometimes with incorrect spiraling rotation and/or compensation of the laminations relative to each other.

To overcome these drawbacks, IT MI96A002566 teaches the formation of laminations provided with fasteners and recesses, all positioned on the same circumference such that when the laminations are superposed, the fasteners become inserted into the recesses to form the connection.

However the lamellar structures provided with the aforedescribed laminations have also proved to be insufficiently effective because the height of the fasteners must be in relation to the thickness of the laminations to ensure correct connection.

Moreover, with the aforedescribed traditional systems it has proved very complicated (in particular from the machine viewpoint) to achieve correct lamination spiraling and/or compensation.

However the rotations to be imposed on the laminations can also be very large (for example up to 180°) and in particular for very tall lamellar structures, i.e. composed of a large number of superposed laminations in which the offsetting between one and the next lamination is small, the traditional systems are unable to ensure maintenance of a correct spiraling angle and/or compensation for all laminations, for example at their ends.

SUMMARY OF THE INVENTION

The technical aim of the present invention is therefore to provide a laminar article for electrical use, a method and a machine by which the stated technical drawbacks of the known art are eliminated.

Within the scope of this technical aim, an object of the invention is to provide a laminar article, a method and a machine in which the superposed laminations are in direct mutual contact, to hence eliminate the air spaces between adjacent laminations; in this manner both the electrical characteristics of the structure and its mechanical and dimensional characteristics are improved, and with elimination of the undesired "springy effect".

Another object of the invention is to provide a laminar article, a method and a machine in which the height of the fasteners is independent of the lamination thickness.

A further object of the invention is to provide a laminar article, a method and a machine in which spiralling and/or compensation can also be achieved with very small angles without the risk of the laminations not being able to maintain these angles (for example at their ends).

The technical aim, together with these and further objects, are attained according to the present invention by a laminar article, a method and a machine in accordance with the accompanying claims.

BRIEF DESCRIPTION OF THE DRAWINGS

Further characteristics and advantages of the invention will be more apparent from the description of a preferred but non-exclusive embodiment of the laminar article of the invention, illustrated by way of non-limiting example in the accompanying drawings, in which:

FIG. 1 shows a front elevation of a laminar article according to the invention in the form of a stator;

FIG. 2 shows an enlarged detail of the coupling system of the stator of FIG. 1;

FIGS. 3 and 4 show respectively a cross-section taken on the line III-III of FIG. 4 and a plan view, of a first constituent lamination of the stator of FIG. 1;

FIGS. 5 and 6 show respectively a cross-section taken on the line V-V of FIG. 6 and a plan view, of a second constituent lamination of the stator of FIG. 1;

FIG. 7 shows a front elevation of a laminar article according to the invention in the form of a rotor;

FIG. 8 shows an enlarged detail of the coupling system of the rotor of FIG. 7;

FIGS. 9 and 10 show respectively a cross-section taken on the line IX-IX of FIG. 10 and a plan view, of a first constituent lamination of the rotor of FIG. 7;

FIGS. 11 and 12 show respectively a cross-section taken on the line XI-XI of FIG. 12 and a plan view, of a second constituent lamination of the rotor of FIG. 7;

DETAILED DESCRIPTION OF THE INVENTION

Figure 13:
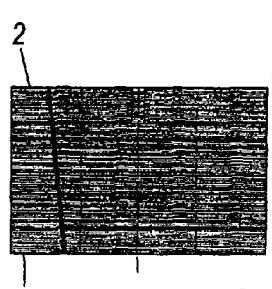
FIG. 13 shows a front elevation of a laminar article of the invention in the form of a rotor of a different embodiment.
Figure 19:
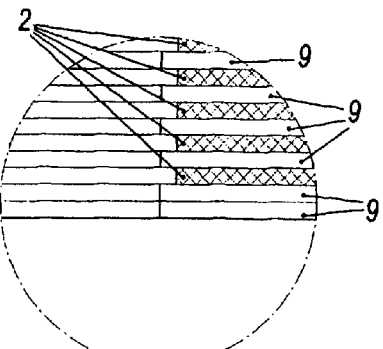
FIG. 19 is a section taken on the axis of the rotor of FIG. 13.
Figure 14:
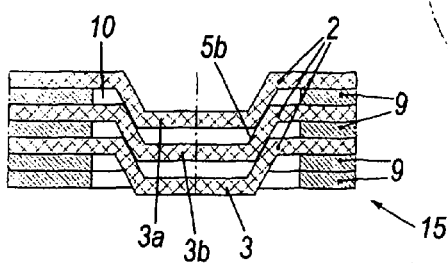
FIG. 14 shows an enlarged detail of the coupling system of the rotor of FIG. 13.
Figure 15:
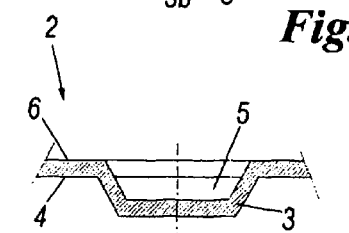
FIGS. 15 and 16 show respectively a cross-section taken on the line XV-XV of FIG. 16 and a plan view, of a first constituent lamination of the rotor of FIG. 13.
Figure 17:
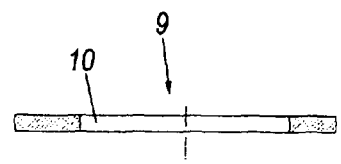
FIGS. 17 and 18 show respectively a cross-section taken on the line XVII-XVII of FIG. 18 and a plan view, of a second constituent lamination of the rotor of FIG. 13.

With reference to said figures, these show a laminar article for electrical use, indicated overall by the reference numeral 1.

The electrical article comprises a plurality of superposed first metal laminations 2 fixed together.

Each of the first laminations 2 is provided with at least one fastener 3 which projects from a surface 4 thereof and defines in its opposite surface 6 a recess 5.

With particular reference to FIG. 2, each fastener 3a of a lamination 2 is arranged to fit into a recess 5b defined by the opposite side of a fastener 3b of a lamination 2 adjacent to it.

The laminar article 1 also presents second laminations 9, interposed between the fixed-together adjacent first laminations 2.

These second laminations 9 are provided with through apertures 10 which are traversed by the fasteners 3 to fix the adjacent first laminations 2 together.

In different embodiments, the laminar article 1 can present groups of first laminations 2 alternating with groups of second laminations 9; for example the laminar article 1 can comprise a pack of ten first laminations 2, three second laminations 9, then again ten first laminations 2, then again three second laminations 9 and so on, until the required dimensions of the laminar element 1 have been achieved.

Alternatively the groups of first laminations 2 can comprise a single lamination and the groups of second laminations can comprise a single lamination 9; this example is shown in FIGS. 1 and 2 which show the first and second laminations 2, 9 alternating.

Preferably the laminar article of the invention presents a first terminal end 15 at which at least two of the mutually adjacent second laminations 9 are positioned and a second terminal end (distant from the first) at which at least two first laminations 2 are positioned directly fixed together without second laminations 9 being interposed.

The apertures 10 in the second laminations are dimensioned such that they are traversed by the fasteners 3 without interference, or with interference on at least one of their circumferential sides 10a, 10b (on the side of the inner and/or outer circumference).

Figure 16:
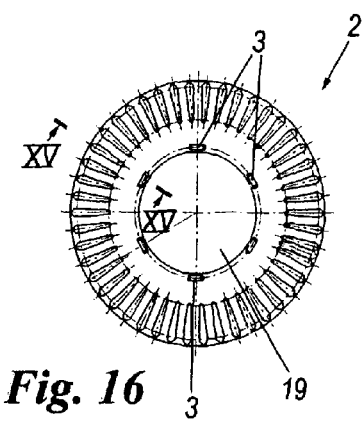
Figure 18:
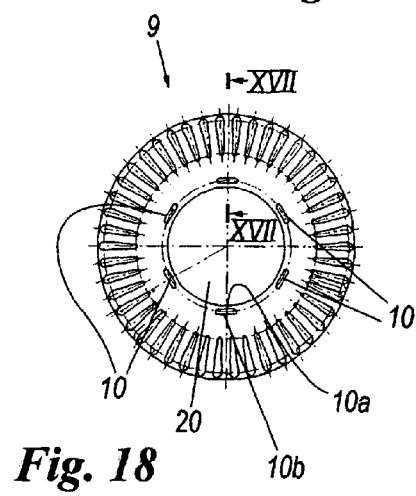

Typically the laminations (both the first laminations 2 and the second laminations 9) present a central hole 19, 20 (FIGS. 16, 18).

In a particular embodiment of the invention, the central hole 19 of the first laminations 2 has a greater diameter than the central hole 20 of the second laminations 9; i.e. in practice the second laminations 9 project inwards from the first laminations 2 because the diameter of the hole 19 in the first laminations 2 is greater than the diameter of the hole 20 in the second laminations 9.

This prevents any deformation due to the connection between the fasteners 3 and recesses 5 having negative repercussions on the lamellar structure.

In a further embodiment of the laminar article of the invention (FIGS. 4, 6), the first and second laminations 2, 9 present male/female elements 22 which can be fixed together to prevent mutual rotation.

Detailed descriptions are given hereinafter of a stator and two different rotors formed in accordance with the present invention.

Stator

The stator of an electrical machine such as a motor is shown in FIGS. 1-6.

It comprises a plurality of fixed-together first laminations 2 with interposed second laminations 9.

Each of the first laminations 2 presents eight fasteners 3 (and hence eight recesses 5 defined by the opposite side of the fasteners 3), the second laminations 9 correspondingly presenting eight apertures 10 which are traversed by the fasteners 3 with interference both on the inner circumferential side 10a and on the outer circumferential side 10b of the aperture 10.

The first end 15 presents two mutually adjacent second laminations 9 (retained by the fasteners 3 of the first lamination which are inserted through their apertures 10), the opposite end presenting two first laminations 2 directly fixed together.

In this case the diameter of the holes 19 in the first laminations 2 and of the holes 20 in the second laminations 9 are equal.

Finally the first and second laminations are provided with male/female antirotation elements 22.

ROTOR

First Embodiment

The rotor of the first embodiment is for example the rotor of an electrical machine such as a motor; it is shown in FIGS. 7-12.

It comprises a plurality of fixed-together first laminations 2 with interposed second laminations 9.

Each of the first laminations 2 presents six fasteners 3, the second laminations 9 correspondingly presenting six apertures 10 which are traversed by the fasteners 3 with interference both on the inner-circumference side 10a and on the outer-circumference side 10b of the aperture 10.

The first end 15 presents two mutually adjacent second laminations 9 retained by the fasteners 3, the opposite end presenting two first laminations 2 directly fixed together by the fasteners 3 and the recesses 5.

In this case the diameter of the holes 19 in the first laminations 2 and of the holes 20 in the second laminations 9 are equal.

ROTOR

Second Embodiment

The rotor of the second embodiment is shown in FIGS. 13-18.

It has a similar structure to that described in the first embodiment.

However, in this case the diameter of the holes 19 in the first laminations 2 is greater than the diameter of the holes 20 in the second laminations 9.

The present invention also relates to a method for producing the described laminar article for electrical use.

The method consists of die-cutting a plurality of laminations from a metal sheet, rotating the die-cut laminations and superposing them, to then fix them together in predetermined manner.

The laminations are die-cut with a reference axis thereof rotated through a predetermined angle about a reference axis of the sheet metal, to limit the rotations to be imposed on the laminations during their mutual fixing.

The invention also relates to a machine for producing the described laminar article for electrical use.

The machine comprises a plurality of die-cutting stations for separating a plurality of laminations from a metal sheet, possibly followed, in series therewith, by rotation stations to rotate the laminations in predetermined manner relative to each other (to effect spiraling and/or compensation); means are also provided to superpose and fix together the die-cut and possibly rotated laminations.

Advantageously, the die-cutting stations are arranged to cut out the laminations with a reference axis thereof rotated through a predetermined angle about a reference axis of the sheet metal, in order to limit the rotations to be imposed on the laminations in the rotation stations.

The die-cutting stations present at least one blanking punch for cutting out the fasteners 3 of the first laminations 2 and/or cutting out the apertures 10 of the second laminations 9.

The punch moves with reciprocating movement from and towards a die which supports the sheet metal to be die-cut; in a subsequent step the die and the relative punch can be rotated through a predetermined angle to punch out the fasteners and apertures, which are hence rotated about the fasteners and apertures punched from the laminations formed in a preceding step.

Each punch can be advantageously activated or deactivated at each press action, it being possible in a subsequent station to rotate the die through a different angle at each press action.

This enables the following to be achieved:
the laminations formed are without the characteristic "springy effect" of traditional lamellar structures;
rotations can be imposed in the rotation station which are limited to the laminations themselves;
laminations can be formed which are longer than the machine pitch;
a double spiralling helix can be achieved;
a different axis hole can be formed.

It has been found in practice that the article for electrical use, the method and machine for producing said laminar article according to the invention are particularly advantageous because they enable laminar articles with optimum electrical characteristics to be obtained which are very compact and are without the characteristic "elastic" effect which characterises those traditional laminar articles which are directly assembled within the blanking die.

In addition, the indicated method results in a reduction in the angle through which the die-cut laminations have to be rotated to effect compensation before they are fixed together.

The article for electrical use, the method and machine for producing said laminar article conceived in this manner are susceptible to numerous modifications and variants, all falling within the scope of the inventive concept; moreover all details can be replaced by technically equivalent elements.

In practice the materials used and the dimensions can be chosen at will according to requirements and to the state of the art.

We claim:

1. A laminar article for electrical use comprising a plurality of superposed first metal laminations fixed together, each of said first laminations being provided with at least one fastener projecting from a first surface thereof and defining a recess in its opposite side, each fastener of one lamination being arranged to fit into a recess of an adjacent lamination, said laminar article further presenting at least one second lamination interposed between at least two fixed-together adjacent first laminations, said second lamination being provided with at least one through aperture which is traversed by the fastener which fixes said two adjacent first laminations together.

2. A laminar article as claimed in claim 1, further presenting groups of first laminations alternating with groups of second laminations.

3. A laminar article as claimed in claim 1, wherein the groups of first laminations comprise a single lamination and the groups of second laminations comprise a single lamination.

4. A laminar article as claimed in claim 1, further presenting a first terminal end at which at least two of said mutually adjacent second laminations are positioned and are retained by inserting through their apertures the fasteners of the first laminations.

5. A laminar article as claimed in claim 1, further presenting a second terminal end at which at least two of said first laminations are positioned directly fixed together without second laminations being interposed.

6. A laminar article as claimed in claim 1, wherein said at least one aperture of said second lamination is dimensioned such as to be traversed by said fasteners with interference on the inner circumferential side and/or on the outer circumferential side of the aperture.

7. A laminar article as claimed in claim 1, wherein said at least one aperture of said second lamination is dimensioned such as to be traversed by said fasteners without interference.

8. A laminar article as claimed in claim 1, wherein said first laminations and said second laminations present a central hole, the central hole of said first laminations having a greater diameter than the central hole of said second laminations.

9. A laminar article as claimed in claim 1, wherein said first and second laminations present male/female elements which can be fixed together to prevent mutual rotation.

10. A method for producing the laminar article of claim 1 for electrical use consisting of die-cutting a plurality of laminations from a metal sheet, rotating the die-cut laminations and superposing them, to then fix them together in predetermined manner, wherein said laminations are die-cut with a reference axis thereof rotated through a predetermined angle about a reference axis of the sheet metal, to limit the rotations to be imposed on the laminations during their mutual fixing.

11. A machine for producing the laminar article of claim 1 for electrical use comprising a plurality of die-cutting stations for separating a plurality of laminations from a metal sheet followed, in series therewith, by rotation stations to rotate the laminations in predetermined manner relative to each other, and means for superposing and fixing together the die-cut and rotated laminations, wherein said die-cutting stations are arranged to cut out the laminations with a reference axis thereof rotated through a predetermined angle about a reference axis of the sheet metal, in order to limit the rotations to be imposed on the laminations in the rotation stations.

12. A machine as claimed in claim 11, wherein said die-cutting stations present at least one blanking punch for cutting out the fasteners and the apertures of said laminations, the punch moving with reciprocating movement from and towards a die which supports the sheet metal to be die-cut; in a subsequent step the die and the relative punch can be rotated through a predetermined angle to punch out the fasteners and apertures, which are hence rotated about the fasteners and apertures punched from the laminations formed in a preceding step.

13. A machine as claimed in claim 12, wherein each punch can be activated or deactivated at each press action.

14. A machine as claimed in claim 12, wherein the die is arranged to rotate through a different angle at each press action.

* * * * *